United States Patent [19]

East et al.

[11] 4,003,448

[45] Jan. 18, 1977

[54] JET CATCHERS

[75] Inventors: Lionel Fitzroy East; Kenneth George Winter, both of Bedford, England

[73] Assignee: National Research Development Corporation, London, England

[22] Filed: Feb. 4, 1975

[21] Appl. No.: 547,097

[30] Foreign Application Priority Data

Feb. 7, 1974 United Kingdom ............... 5766/74

[52] U.S. Cl. ...................... 181/33 HE; 181/33 HB
[51] Int. Cl.² .......................................... E04B 1/99
[58] Field of Search .................... 181/33 H–33 HE, 181/55, , 68, 70; 244/1 N

[56] References Cited

UNITED STATES PATENTS

| | | | |
|---|---|---|---|
| 1,067,200 | 7/1913 | Schlosberg | 181/70 |
| 2,685,936 | 8/1954 | Brenneman | 181/33 HE |
| 2,979,151 | 4/1961 | Blackwell | 181/68 |
| 3,196,977 | 7/1965 | Sanders | 181/33 HB |

FOREIGN PATENTS OR APPLICATIONS

| | | | |
|---|---|---|---|
| 1,347,893 | 11/1962 | France | 181/49 |
| 1,343,005 | 10/1962 | France | 181/55 |
| 678,851 | 9/1952 | United Kingdom | 181/33 AB |

*Primary Examiner*—George H. Miller, Jr.
*Assistant Examiner*—Vit W. Miska
*Attorney, Agent, or Firm*—Cushman, Darby & Cushman

[57] ABSTRACT

A Jet Catcher, which is a device for dissipating the energy of a gaseous jet flow, comprises a base member and a plurality of porous screens mounted on the base member. The screens are so mounted that when the Jet Catcher is in use with an axis of the catcher parallel to the direction of flow of the jet the angles of the screens to the direction of flow of the undisturbed jet decrease in the downstream direction. The base member is preferably of combined conical/frustoconical or combined pyramidal/frusto-pyramidal form with the apex being, in use, the most upstream point of the base member.

14 Claims, 8 Drawing Figures

JET CATCHERS

The present invention relates to devices, henceforth referred to as jet catchers, for dissipating the energy of gaseous jet flows.

There are many examples of gaseous jet flows causing undesirable draughts in their vicinity. Examples are cooling air efflux from machinery, efflux from open wind-tunnels of the type used for aeronautical research, and efflux from aircraft gas turbine engines during ground running. Draughts can be annoying to personnel, and in the case of a wind-tunnel exhausting into a room can also affect the airflow at the entrance, and hence the working section, of the wind-tunnel.

According to the present invention a jet catcher includes a base member and a plurality of porous screens mounted on the base member, the screens being so inclined relative to an axis that when the jet catcher is placed in a free stream gaseous jet (that is, a gaseous jet flowing through a gaseous atmosphere and not through a pipe or similar construction) with the axis parallel to the direction of flow of the jet the angles of the screens to the direction of flow of the undisturbed jet decrease in the downstream direction.

Preferably the base member is formed from one or more conical or pyramidal portions with the axis of the jet catcher being the axis of symmetry of the base member, the screens being so disposed relative to the base member that when the jet catcher is placed in a gaseous jet the apex of the base member is the upstream extremity of the base member. When more than one portion is included in the base member the semi-angle of each downstream portion is greater than that of the adjacent upstream portion.

The screens are preferably comprised of conventional wire gauze but may alternatively be, for example, perforated plates.

Various form of the invention are now described, by way of example only, with reference to the accompanying diagrammatic drawings, of which:

Figure 3:
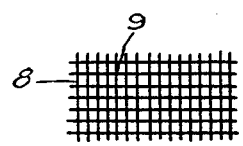
FIG. 3 is a detailed view of a segment of wire gauze.

A body 1 (FIGS. 1 and 2) of combined conical and frusto-conical shape has an apex 2, an axis 10, a base 3, a conical portion having a surface 4 and a frusto-conical portion having a surface 5, the semiangle of the frusto-conical portion being greater than that of the conical portion. From the apex 2 a conical first screen 11 is supported having an acute angle $\alpha$ to the axis 10 and a diameter equal to the diameter of the base. A cylindrical second screen 6 extends from the base 3 of the body to meet the first screen 11. a third screen 7 of frusto conical shape extends from the junction of the first and second screens 11 and 6 to the intersection of the surface 4 and the surface 5 of the body. For clarity details of the screens 6, 7, 11 are omitted from FIG. 2, but might typically be formed (FIG. 3) from a plurality of parallel wires 8 and a plurality of parallel wires 9, the wires 8 and 9 being at right angles to one another. The relative positions of the wires 8, 9 can be maintained by any conventional means such as interweaving or spot welding.

Figure 1:
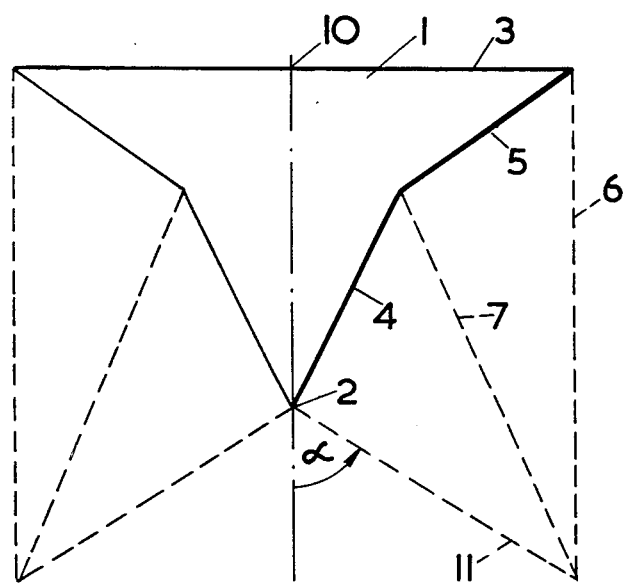
FIG. 1 is a plan of a jet catcher.

In operation the jet catcher is disposed with its axis 10 along the centre of a free stream gaseous jet, indicated by the arrow V in FIG. 1. As the jet passes in turn through the screens 11, 7 and 6 its direction of flow is altered outwardly relative to the direction of flow of the undisturbed jet in a manner analogous to the refraction of light at an optical surface, and some of its momentum is destroyed. The result is a smooth diffusion of the jet into the surrounding air. It will be noted that the angles between the screens 11, 7 and 6 and the direction of flow of the undisturbed jet (in effect, the axis 10) decrease in the downstream direction.

The relative angles of the screens 6, 7, and 11, and of the surfaces 4, 5 to the axis 10 will depend on the flow turning properties of the particular screen material being used.

It will be apparent that the detail design, such as size, geometry, screen material and number of screens, of a particular jet catcher will depend on the proposed use of the jet catcher.

As an example, a jet catcher was designed for a small blower windtunnel having no diffuser downstream of the working section. The tunnel was designed to have alternative working sections of dimensions 1.2 m × 0.3 m or 0.6 m × 0.6 m respectively and to exhaust at speeds of up to 50 m/s. In view of the rectangular shape of the wind-tunnel it was decided to use a body in the shape of a pyramid for the base of the jet catcher. The base was designed to have an axial height of 0.45 m and maximum rectangular dimensions in a plane normal to the axis of 1.5 m × 0.9 m. Three screens of mesh size 30 wires to the inch and using 33 gauge wire were fitted substantially as described above with reference to FIGS. 1 to 3.

Prior to installation of the jet catcher the room containing the wind-tunnel was exceesively draughty, but installation of the jet catcher almost eliminated eddying flows in the room.

It should be noted that by aiding smooth diffusion of a jet into the surrounding air, a jet catcher reduces noise from the jet.

Figure 2:
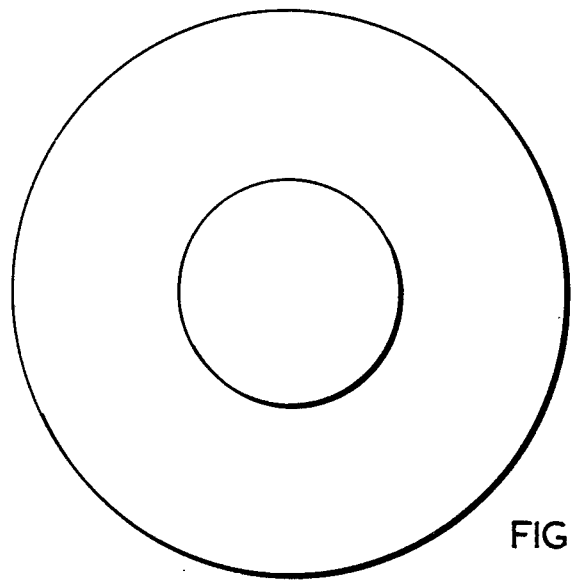
FIG. 2 is an elevation of the jet catcher shown in FIG. 1.
Figure 4:
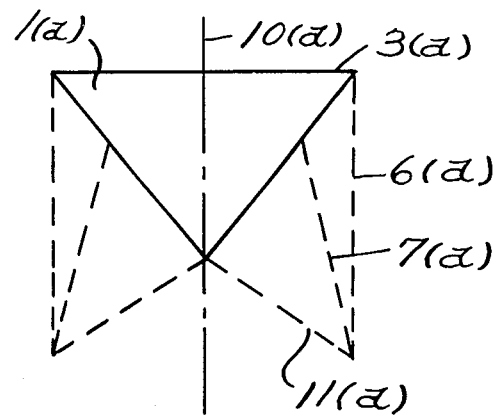
FIGS. 4, 5, 6, 7 and 8 illustrate alternative embodiments of the invention.
Figure 5:
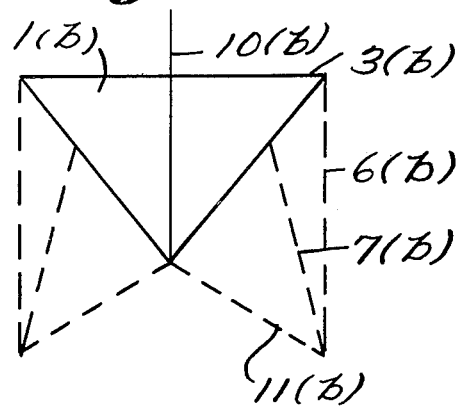
Figure 7:
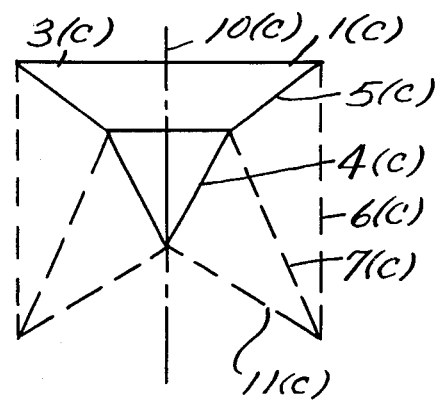
Figure 6:
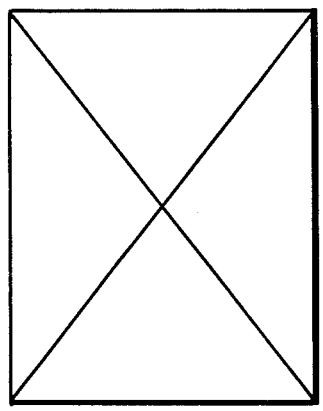
Figure 8:
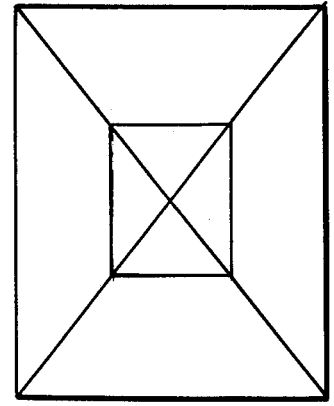

Alternative embodiments of the invention are illustrated in FIG. 4, where a body 1a of conical shape is used, in FIGS. 5 and 6 where a body 1b of pyramidal shape is used, and in FIGs. 7 and 8 where a body 1c of combined pyramidal and frustopyramidal shape is used. In the embodiments of these drawings, like characteristics as in the embodiment of FIGS. 1 and 2 are indicated by like numerals, with the addition of subscript a, b and c, respectively.

What I claim is:

1. A jet catcher for use in an unenclosed gaseous jet stream comprising a base member having a central axis; said base member including a top portion, a bottom portion located in a downstream direction from the top portion when said central axis is disposed substantially parallel to the direction of flow of said unenclosed gaseous jet stream, and sides diverging outwardly from the central axis as they join the top portion to said bottom portion; and a plurality of porous screens extending from upstream of the base member to positions along said sides with each screen extending at an angle with respect to said central axis, said angle of each screen and said central axis decreasing successively in said downstream direction so that on passage through each screen the portion of the jet stream caught by the jet catcher will be deflected outwardly away from said central axis.

2. A jet catcher as claimed in claim 1 wherein the screens are formed of wire gauze.

3. A jet catcher as claimed in claim 1 wherein the base member is of conical form with the axis of the jet catcher being the axis of symmetry of the base member, the screens being so disposed relative to the base member that when the jet catcher is placed in a gaseous jet the apex of the conical form is the upstream extremity of the base member and forms the top portion thereof.

4. A jet catcher comprising; a base member having a conical portion and a frusto conical portion, the semi angle of the frusto conical portion being greater than that of the conical portion; a first screen, mounted on the apex of the conical portion, of conical shape with its apex secured to the apex of the conical portion and with its axis being an extension of the axis of symmetry of the base member; a second screen connecting the extremities of the base member and the first screen; and a third screen extending from the junction of the conical and the frusto conical portions of the base member to the junction of the first and second screens.

5. A jet catcher as claimed in claim 4 wherein the screens are formed of wire gauze.

6. A jet catcher comprising; a base member having a pyramidal portion and a frusto-pyramidal portion, the semi-angle of the frusto-pyramidal portion being greater than that of the pyramidal portion; a first screen, mounted on the apex of the pyramidal portion, of pyramidal shape with its apex secured to the apex of the pyramidal portion and with its axis being an extension of the axis of symmetry of the base member; a second screen connecting the extremities of the base member and the first screen; and a third screen extending from the junction of the pyramidal and the frusto-pyramidal portions of the base member to the junction of the first and second screens.

7. A jet catcher as claimed in claim 6 wherein the screens are formed of wire gauze.

8. A jet catcher for use in an unenclosed gaseous jet stream comprising a base member having a central axis, said base member being of pyramidal form with the axis of the jet catcher being the axis of symmetry of the base member, a plurality of porous screens mounted on said base member about said central axis, with each screen extending at an angle with respect to said central axis, said angle of each screen and said central axis decreasing successively in a downstream direction when said central axis is disposed substantially parallel to the direction of flow of an unenclosed gaseous jet stream, the screens being so disposed relative to the base member that when the jet catcher is placed in a gaseous jet the apex of the base member is the upstream extremity of the base member so that on passage through each screen the portion of the jet stream caught by the jet catcher will be deflected outwardly away from said central axis.

9. A jet catcher for use in an unenclosed gaseous jet stream comprising a base member having a central axis, said base member including a conical portion and at least one frusto-conical portion with the axis of the jet catcher being the axis of symmetry of the base member, a plurality of porous screens mounted on said base member about central axis, with each screen extending at an angle with rspect to said central axis, said angle of each screen and said central axis decreasing successively in a downstream direction when said central axis is disposed substantially parallel to the direction of flow of an unenclosed gaseous jet stream, the screens being so disposed relative to the base member that when the jet catcher is placed in a gaseous jet the apex of the conical portion is the upstream extremity of the base member, the semi-angle of each downstream portion being greater than that of the adjacent upstream portion, so that on passage through each screen the portion of the jet stream caught by the jet catcher will be deflected outwardly away from said central axis.

10. A jet catcher as claimed in claim 9 having a screen mounted at each intersection of adjoining portions.

11. A jet catcher as claimed in claim 10 wherein the screens are formed of wire gauze.

12. A jet catcher for use in an unenclosed gaseous jet stream comprising a base member having a central axis, said base member including a pyramidal portion and at least one frusto-pyramidal portion with the axis of the jet catcher being the axis of symmetry of the base member, a plurality of porous screens mounted on said base member about said central axis, with each screen extending at an angle with respect to said central axis, said angle of each screen and said central axis decreasing successively in a downstream direction when said central axis is disposed substantially parallel to the direction of flow of an unenclosed gaseous jet stream, the screens being so disposed relative to the base member that when the jet catcher is placed in a gaseous jet the apex of the pyramidal portion is the upstream extremity of the base member, the semi-angle of each downstream portion being greater than that of the adjacent upstream portion, so that on passage through each screen the portion of the jet stream caught by the jet catcher will be deflected outwardly away from said central axis.

13. A jet catcher as claimed in claim 11 having a screen mounted at each intersection of adjoining portions.

14. A jet catcher as claimed in Claim 13 wherein the screens are formed of wire gauze.

* * * * *